United States Patent
Brück

(10) Patent No.: US 8,869,510 B2
(45) Date of Patent: Oct. 28, 2014

(54) EXHAUST GAS CLEANING COMPONENT WITH DEFLECTION SURFACE, METHOD FOR PRODUCTION THEREOF AND MOTOR VEHICLE HAVING THE COMPONENT

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 87 days.

(21) Appl. No.: 13/482,098

(22) Filed: May 29, 2012

(65) Prior Publication Data
US 2012/0260639 A1  Oct. 18, 2012

Related U.S. Application Data

(63) Continuation of application No. PCT/EP2010/067370, filed on Nov. 12, 2010.

(30) Foreign Application Priority Data

Nov. 27, 2009  (DE) .......................... 10 2009 056 183

(51) Int. Cl.
| | |
|---|---|
| F02B 27/04 | (2006.01) |
| F01N 1/00 | (2006.01) |
| F01N 3/00 | (2006.01) |
| F01N 3/10 | (2006.01) |
| F01N 13/00 | (2010.01) |
| F01N 3/28 | (2006.01) |

(52) U.S. Cl.
CPC .......... *F01N 3/2892* (2013.01); *F01N 13/0097* (2013.01); *F01N 2490/00* (2013.01); *F01N 3/28* (2013.01); *F01N 2240/20* (2013.01); *F01N 2470/16* (2013.01)
USPC .................. 60/273; 60/288; 60/296; 60/299; 60/324

(58) Field of Classification Search
USPC .................. 60/273, 282, 288, 296, 299, 324; 422/169, 170, 177, 181
See application file for complete search history.

(56) References Cited

U.S. PATENT DOCUMENTS 5,934,069 A * 8/1999 Hertl et al. ....................... 60/274
5,996,339 A * 12/1999 Gottberg et al. ................. 60/299

(Continued)

FOREIGN PATENT DOCUMENTS

DE  195 18 536 A1  7/1996
DE  19518536 A1 * 7/1996 ................ F01N 3/02

(Continued)

OTHER PUBLICATIONS

Chen et al. CFD Modeling of 3-Way Catalytic Converters with Detailed Catalytic Surface Reaction Mechanism. SAE International (2004).*

(Continued)

*Primary Examiner* — Thomas Denion
*Assistant Examiner* — Mickey France
(74) *Attorney, Agent, or Firm* — Laurence A. Greenberg; Werner H. Stemer; Ralph E. Locher

(57) ABSTRACT

A method for producing an exhaust gas cleaning component having a carrier structure with an inflow side, an outflow side, a predefined through-flow direction and a deflection surface disposed opposite the outflow side, includes at least the following steps: providing the carrier structure, subjecting the carrier structure to an exhaust gas flowing from the inflow side to the outflow side in the predefined through-flow direction, determining a distribution of flow velocities on the outflow side of the carrier structure, and configuring the shape of the deflection surface with at least one backpressure element in dependence on the distribution of flow velocities on the outflow side, so that the distribution of flow velocities is equalized. An exhaust gas cleaning component and a motor vehicle having the exhaust gas cleaning component are also provided.

8 Claims, 2 Drawing Sheets

(56) References Cited

U.S. PATENT DOCUMENTS

2006/0107656 A1     5/2006    Bruck
2008/0110341 A1*   5/2008    Ketcham et al. ............... 95/274

FOREIGN PATENT DOCUMENTS

| | | |
|---|---|---|
| DE | 199 55 013 A1 | 5/2001 |
| DE | 10009124 A1 | 8/2001 |
| DE | 10155086 A1 | 5/2003 |
| DE | 10301138 A1 | 7/2004 |
| WO | 2005/001252 A1 | 1/2005 |

OTHER PUBLICATIONS

International Search Report of PCT/EP2010/067370, Dated Mar. 31, 2011.

* cited by examiner

US 8,869,510 B2

EXHAUST GAS CLEANING COMPONENT WITH DEFLECTION SURFACE, METHOD FOR PRODUCTION THEREOF AND MOTOR VEHICLE HAVING THE COMPONENT

CROSS-REFERENCE TO RELATED APPLICATION

This is a continuation, under 35 U.S.C. §120, of copending International Application No. PCT/EP2010/067370, filed Nov. 12, 2010, which designated the United States; this application also claims the priority, under 35 U.S.C. §119, of German Patent Application DE 10 2009 056 183.8, filed Nov. 27, 2009; the prior applications are herewith incorporated by reference in their entirety.

BACKGROUND OF THE INVENTION

Field of the Invention

The invention relates to a method for producing an exhaust gas cleaning component, especially of a compact catalytic converter operating in counterflow mode, having a deflection surface for deflecting an exhaust gas flow flowing in an inflow direction into a return flow direction. The invention also relates to an exhaust gas cleaning component and a motor vehicle having the exhaust gas cleaning component.

As a result of the constant increase in motor traffic and the ever-stricter exhaust gas standards, it is important for motor vehicles with internal combustion engines that the exhaust gases of those engines be cleaned efficiently. For that purpose, the prior art discloses exhaust gas cleaning systems in which the exhaust gas of the internal combustion engine is directed past a catalytically active surface and harmful substances in the exhaust gas, such as nitrogen oxide compounds, soot particles or carbon monoxide, are converted into harmless substances such as nitrogen, water and $CO_2$ with the aid of a catalyst deposited on that surface. Comparatively high exhaust gas temperatures are generally required for efficient conversion of exhaust gases. The temperatures of the exhaust gases of an internal combustion engine are as a rule highest directly after the exhaust gases have left the internal combustion engine, so that in that case, in proximity to the engine in the engine compartment of a motor vehicle, would be a most favorable location for placing an exhaust gas cleaning system. However, the installation space close to the engine is generally very limited in motor vehicles. For that reason, conventional exhaust systems are as a rule disposed in the underbody of the motor vehicle, where considerably more space is available.

In order to nevertheless be able to utilize the limited installation space in the engine compartment for exhaust gas cleaning systems, especially compact exhaust gas cleaning components with concentric flow have been developed, as is known, for example, from International Publication No. WO 05/001252 A1, corresponding to U.S. Patent Application Publication No. US 2006/0107656 A1. In such an exhaust system the exhaust gas flows first through an inflow region, is then deflected, and flows back at least partially through a return flow region. In that case the return flow region is disposed concentrically around the inflow region, so that efficient heat exchange takes place between inflow region and return flow region. The catalytic reactions taking place on the catalytic converter surfaces of an exhaust system are in most cases also exothermic. For that reason the exhaust gas is heated in an exhaust system and the exhaust gases flowing back are generally hotter than the inflowing exhaust gases. Thus, through the efficient heat exchange between inflow and return flow, the exhaust gas temperature in the exhaust system can be increased or kept high, so that especially efficient conversion takes place. At the same time, through the division of the exhaust system into inflow region, deflection and return flow region, an especially compact configuration of the exhaust system is achieved, so that the system can be disposed in the engine compartment and in proximity to the internal combustion engine of a motor vehicle.

With such compact catalytic converter configurations, it has been found that at least very sharply angled flow guides are required at the inlet in order to conform to the available installation space in the region of the engine. The flow within such exhaust systems is therefore generally not uniform, leading to inefficient utilization of the catalytic surfaces provided therein. For that reason the exhaust systems must frequently be dimensioned larger than would be required with uniform through-flow and efficient utilization of the catalytically active surface. In addition, the inefficient utilization of the catalytic material on the catalytically active surfaces is disadvantageous, since that material generally contains expensive noble metals and the quantity of those noble metals in exhaust gas treatment components should be as small as possible in order to save costs.

SUMMARY OF THE INVENTION

It is accordingly an object of the invention to provide an exhaust gas cleaning component with a deflection surface, a method for production thereof and a motor vehicle having the component, which overcome the hereinafore-mentioned disadvantages and further mitigate the highlighted technical problems of the heretofore-known components, methods and vehicles of this general type. In particular, an especially advantageous method for producing an exhaust gas cleaning component, which at least partially solves the problems described hereinbefore, is to be presented. In addition, an especially advantageous exhaust gas cleaning component is to be presented. Furthermore, the region between the engine and the first exhaust gas cleaning component is to be as short as possible and a reduction of flow turbulence is to be avoided, in order to ensure high catalytic activity of the catalytic converter configuration positioned close to the engine. It is likewise to be achieved that the exhaust gas also flows as uniformly as possible over edge regions of the catalytic converter configuration, especially in the case of annular catalytic converters which are disposed in a return flow region.

With the foregoing and other objects in view there is provided, in accordance with the invention, a method for producing an exhaust gas cleaning component. The method comprises:

a) providing a carrier structure having an inflow side, an outflow side, a predefined through-flow direction and a deflection surface disposed opposite the outflow side;

b) subjecting the carrier structure to an exhaust gas flowing from the inflow side to the outflow side in the predefined through-flow direction;

c) determining a distribution of flow velocities on the outflow side of the carrier structure; and d) configuring a shape of the deflection surface with at least one backpressure element in dependence on the distribution of the flow velocities on the outflow side to homogenize the distribution of the flow velocities.

The method according to the invention makes it possible to construct an exhaust gas cleaning component in such a way that the exhaust gas flow passing through the exhaust gas cleaning component can be homogenized. In this case the return flow region can, as a rule, be disposed concentrically around the inflow region, so that the efficient heat transfer from return flow region to inflow region described from the prior art can take place.

The steps of the method according to the invention will be explained in detail below with reference to preferred configurations.

In step a) the carrier structure of the exhaust gas cleaning component is generally provided without the components of the exhaust system disposed behind the carrier structure in the flow direction (free or unimpeded outflow and pure deflection of the outflowing exhaust gas). In step a), therefore, an incomplete exhaust gas cleaning component containing all of the components present in the finished exhaust system before the carrier structure in the flow direction, but not the components disposed after the carrier structure, can be provided.

In step b), the carrier structure provided in this way is subjected to an exhaust gas flow. In the context of the method for producing the exhaust gas cleaning component, it is generally advantageous in this case to provide an exhaust gas cleaning flow having particular properties (exhaust gas mass flow, temperature and loading with harmful substances) which corresponds to the exhaust gas flow conditions most frequently encountered in the subsequent operation of the exhaust gas cleaning component and/or to the usual exhaust gas tests. In this way the exhaust gas cleaning component can be adapted to precisely such an especially frequently occurring exhaust gas flow and is therefore especially efficient in operation.

The exhaust gas flow provided may correspond, for example, to the exhaust gas flow under specific operating conditions of a motor vehicle. Such specific operating conditions may be defined, for example, in terms of vehicle speed, the rotational speed of the drive engine and/or the torque of the drive engine. Such specific operating conditions are generally associated with specific properties of the exhaust gases (exhaust gas mass flow, temperature and loading with harmful substances).

It is also possible that not only one exhaust gas flow having specific properties is provided in step b), but a plurality of different exhaust gas flows. For example, exhaust gas flow conditions such as occur in usual tests for determining the fuel consumption and harmful emissions of motor vehicles may be provided. For example, the European NEDC test (New European Driving Cycle) or the American FTP test (Federal Test Procedure) may be applied in this case. In the case of the NEDC test, a motor vehicle performs a standardized driving cycle, having a simulated proportion of urban traffic and a simulated proportion of cross-country traffic, on a roller-type test stand. For this purpose the rolling resistance and air resistance of the motor vehicle are precisely determined beforehand. The FTP simulates a real journey with a motor vehicle. Both tests are known to specialists in this technical field.

Steps a) and b) serve, in particular, to determine the inflow behavior and/or the through-flow behavior of the carrier structure.

Step b) may be carried out in a suitable test structure in which measures for providing the required exhaust gas flow at the same time as measurement signals for monitoring the exhaust gas flow are available.

In step c) a distribution of the flow velocities on the outflow side of the carrier structure is determined. The distribution of the flow velocities is an area function which indicates at which point of the outflow side the exhaust gas flow emerging from the carrier structure has which velocity. Such a distribution of flow velocities can be determined, for example, by measuring or calculating local flow velocities of the exhaust gas flow at different points in an area. This is normally done at discrete measuring points which may be disposed, for example, at the nodes of a network including square network cells. The measuring points are then built up as a measuring grid. In order to obtain a high measurement quality it is advantageous if the measuring grid is oriented symmetrically with respect to the cross section of the carrier structure. In order to increase the measurement quality of the distribution of flow velocities, the number of measuring points may be increased. In addition, the gradient of the flow velocity with respect to the surrounding measuring points may be taken into account for each measuring point.

When a plurality of different exhaust gas flows have already been provided in step b), in step c) a plurality of distributions of gas flows (generated at different load states) can also be determined. In continuation of the method according to the invention, a mean distribution of flow velocities encompassing the individually determined distributions of flow velocities, weighted according to the frequency and duration of their occurrence, can also be determined from these flow velocities.

Then, in step d), the shape of the deflection surface which deflects the exhaust gas flowing from the carrier structure is configured in dependence on the distribution of the flow velocities. The distribution of the flow velocities is, as a rule, uneven over any cross section through the carrier structure or over the outflow side of the carrier structure. In certain regions the flow velocity is significantly elevated with respect to other regions. By correspondingly configuring the deflection surface located opposite the outflow side of the carrier structure with backpressure elements, a homogenizing of the flow velocities on the outflow side, and therefore also partially within the carrier structure and after the deflection, can be achieved. For example, a return flow region disposed concentrically with the carrier structure and including further carrier structures or honeycomb bodies may be provided after the deflection. A suitably configured deflection surface which, for example, extends locally especially close to the outflow side of the carrier structure may form a backpressure element or counterpressure element for the exhaust gas flow between the carrier structure and the deflection surface. As exhaust gas flows through the carrier structure, this backpressure element and/or counterpressure element produces a kind of counterpressure cushion, and/or the flow resistance is thereby increased zonally.

It has been found, surprisingly, that it is advantageous for the overall flow resistance of an exhaust gas cleaning component if the counterpressure is increased zonally by a configuration of the deflection surface. In this way, the problems mentioned in the introduction may, in particular, be reduced.

In accordance with another especially advantageous mode of the method of the invention, the distance between the deflection surface and the outflow side is reduced in step d) to less than 30 mm in regions of elevated flow velocity. Preferably, the distance is reduced even to less than 20 mm. Regions of elevated flow velocity are understood herein to be regions of elevated flow velocity determined in step c) with an undisturbed distribution of flow velocities, that is when a deflection surface influencing the flow on the outflow side is not present. It has been found that a distance of less than 30 mm between the deflection surface and the outflow side is useful in forming a counterpressure cushion between the deflection surface and the outflow side which causes a significant redistribution of flow.

In accordance with a further advantageous mode of the method of the invention, in step d) the shape of the deflection surface is configured zonally to be substantially mirror-inverted with respect to the shape of the distribution of flow velocities. This means, in particular, that the deflection surface approaches especially closely to the outflow side of the carrier structure in regions of elevated flow velocity, while it is at a greater distance from the outflow side of the deflection surface in regions of relatively low flow velocity. It should also be taken into account with respect to the deflection surface that, in addition to the function of homogenizing the flow, it still generally has the function of deflecting the exhaust gas flow. For this reason it is advantageous if the configuration of the shape of the deflection surface for homogenizing the flow is carried out only zonally. In other regions in which the formation of a pressure cushion for homogenizing the flow is not required, the configuration of the shape of the deflection surface is dominated by the function of deflecting the flow.

In accordance with an added advantageous mode of the method of the invention, in step b) the flow impinges on the inflow side of the carrier structure at least partially at an oblique angle to the predefined flow direction. A plurality of partial flows having different angles with respect to the flow direction through the carrier structure may also flow into the carrier structure. An angle of an inflow may be, for example, at least 10° [degrees], preferably at least 20° [degrees] and especially preferably at least 30° [degrees]. In particular, an asymmetric inflow which is homogenized through the use of the following deflection surface is thereby achieved. A preferred field of application of the invention exists here.

With regard to the exhaust gas cleaning components produced by the method according to the invention, it is generally necessary that they can be disposed in an especially space-saving manner in the engine compartment of an internal combustion engine. It is therefore often the case that the exhaust gas flow enters such exhaust gas cleaning components obliquely (that is, at an angle). Precisely in the case of an inflow entering at an angle, an uneven distribution of flow velocities generally occurs on the outflow side of a carrier structure. This can be especially efficiently and effectively compensated by a manufacture of an exhaust cleaning component using the method according to the invention.

With the objects of the invention in view, there is also provided an exhaust gas cleaning component, comprising a carrier structure having an inflow side, an outflow side, a predefined through-flow direction and a deflection surface disposed opposite the outflow side. The deflection surface is configured to cause an exhaust gas flow passing through the exhaust gas cleaning component, with the deflection surface disposed therein, to have a uniformity index greater than 0.8.

Such an exhaust gas cleaning component can be produced, for example, by using the method according to the invention. The uniformity index defines the uniformity of a flow distribution. The uniformity index is determined substantially through the use of an integral of the distribution of flow velocities over the outflow side, which is standardized with a mean flow velocity. The uniformity index is determined from a distribution of flow velocities by using the following formulae:

In order to determine the uniformity index, the local flow velocity $[w_i]$ in an area is determined from a multiplicity of measuring points (number corresponding to index i). The measuring points are preferably distributed uniformly over the area (e.g. through-flowable cross-sectional area parallel to the outflow side of the exhaust gas cleaning component). For example, the measuring points may each be the nodes of an imaginary network having square network cells. A mean flow velocity $[\overline{w}]$ is calculated from this multiplicity of local velocities of the flow. For each measuring point a local nonuniformity index $[\omega_i]$ is determined by standardization of deviations of the local flow velocity $[w_i]$ and the mean flow velocity $[\overline{w}]$ using the following formula:

$$\omega_i = \frac{w_i - \overline{w}}{\overline{w}}$$

A global nonuniformity index $[\overline{\omega}]$ can now be calculated for all of the measuring points as a mean value of the local nonuniformity indices $[\omega_i]$. The uniformity index $[\gamma]$ is calculated as a reversion of this global nonuniformity index $[\overline{\omega}]$ according to the following formula:

$$\gamma = 1 - \frac{\overline{\omega}}{2}$$

A uniformity index of 1.0 corresponds to an absolutely uniform flow distribution. With the aid of the method specified above for determining the distribution of flow velocities it can be checked whether such a uniformity index is present. In order to determine the uniformity index that is present, an exhaust gas flow with defined properties is generally used. These properties include, for example, the exhaust gas mass flow per cross-sectional area, the exhaust gas temperature and the loading of the exhaust gas with harmful substances.

The uniformity index can also be determined for different exhaust gas flows. For example, different exhaust gas flows occurring in a typical test cycle of a motor vehicle (NEDC test or FTP test) may be taken into account. The requirement can then be set that the uniformity index must never, as a mean and/or for a given percentage of the operating time, for example 80%, lie within a defined value range.

In accordance with another feature of the invention, the exhaust gas cleaning component is especially advantageous if the deflection surface has at least one off-center and/or multiple dent. The term "dent" means in this case a region in which the distance between the outflow side and the deflection surface is reduced. A dent may be formed, for example, in the manner of a bulge and/or protuberance of the deflection surface towards the outflow side. The term "off-center" means in this case in particular that the dent is not positioned concentrically opposite the carrier structure, but preferably is disposed outside the center. The term "multiple dent" means that a plurality of separate and/or interconnected dents may be present. Irregular distributions of flow velocities can be especially effectively compensated by such dents. The precise configuration of the dents may be the result of the method according to the invention. It is preferred that the part of the dent located closest to the outflow side of the carrier structure is not pointed but, in particular, forms a plateau, a sphere or a radius. In the region of the dent, the deflection surface preferably lies zonally closely along the outflow side of the carrier structure, so that a pressure cushion area is formed.

Since the provision of the above-described dent is characteristic of a desired influencing of the exhaust gas flow after it has left the carrier structure, this feature may also be used independently (for example, in the case of a desired inhomogeneous flow distribution). For this reason, an exhaust gas cleaning component constructed specifically for this (different) objective is also proposed herein, which component includes a carrier structure having an inflow side, an outflow side and a flow direction, together with a deflection surface disposed opposite the outflow side, the deflection surface having at least one off-center and/or multiple dent. In this case the off-center and/or multiple dent is configured in such a way that (any) desired flow profile is established precisely (only) by the presence of the dent. Optionally, the method described in the introduction may also be adapted to the different objective, so that in step d) a concrete "influencing" or "establishing of a predefined flow distribution" is effected instead of a "homogenization." Moreover, all of the devices and measures described herein may be appropriately combined.

In particular, it is also provided in this case that the inflow conduit of the exhaust gas to the carrier structure is free of built-in elements, so that, in particular, no additional flow guide surfaces projecting into the inflow conduit and/or spaced from the wall of the inflow conduit are provided therein. Such flow guide surfaces require additional installation space (especially if a plurality of inflow conduits is provided) and/or may give rise to a laminar exhaust gas flow whereby the catalytic effectiveness of the first carrier structure may be reduced. Such additional flow guide surfaces also constitute a thermal capacity which can extract heat from the exhaust gas precisely in the heat-up phase of the catalytic converter configuration and therefore prolong the time up to attainment of the light-off temperature of the carrier body. It can therefore be achieved that the region between the internal combustion engine and the first carrier body is as short as possible and reduction of the flow turbulence is avoided, in order to ensure high catalytic activity of the carrier body positioned close to the engine.

In addition, the deflection surface should be configured in such a way that the exhaust gas is distributed as evenly as possible as it flows into a return flow region (disposed concentrically with the first carrier structure) of the exhaust gas cleaning component. In addition to the function of homogenizing the flow in the carrier structure located upstream of it, that is, in the region previously subjected to the flow, the deflection surface therefore additionally has the function of deflecting the exhaust gas uniformly towards the downstream return-flow region through which the flow subsequently passes, and/or towards an annular (catalytically active) honeycomb body. In this case a uniformity index greater than 0.8 is especially preferably also achieved in the return flow region.

An exhaust gas cleaning component according to the invention is also advantageous if the exhaust gas cleaning component has an inflow conduit having a main direction, and if the main direction and the predefined flow direction of the carrier structure are disposed at an angle to one another. With such an inflow conduit an uneven distribution of flow velocities generally occurs on the outflow side of the carrier structure. For this reason an exhaust gas cleaning component according to the invention is especially advantageous in the case of an inflow conduit having a main direction which is disposed at an angle to the flow direction of the carrier structure.

With the objects of the invention in view, there is concomitantly provided a motor vehicle, comprising an internal combustion engine, and an exhaust system for cleaning exhaust gases of the internal combustion engine. The exhaust system has an exhaust gas cleaning component according to the invention or the exhaust system has an exhaust gas cleaning component produced according to the method of the invention.

The advantages and special features which have been described with reference to the method according to the invention are transferable analogously to the exhaust gas cleaning component according to the invention. The same applies to the special advantages and configurations described in relation to the exhaust gas cleaning component according to the invention, which are analogously transferable to the method according to the invention.

Other features which are considered as characteristic for the invention are set forth in the appended claims, noting that the features and steps specified individually in the claims can be combined in any technologically appropriate manner and can be supplemented with explanatory material from the description, where further variants of the invention are indicated.

Although the invention is illustrated and described herein as embodied in an exhaust gas cleaning component with a deflection surface, a method for production thereof and a motor vehicle having the component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
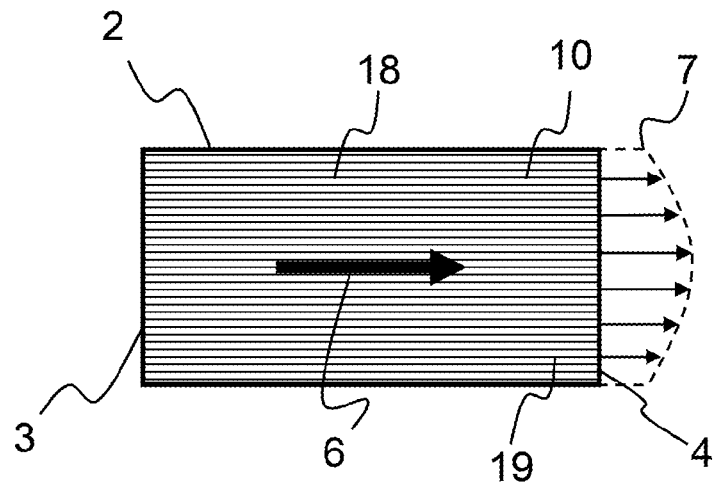
FIG. 1 is a diagrammatic, longitudinal-sectional view of a carrier structure with a distribution of flow velocities.

Referring now to the figures of the drawings in detail and first, particularly, to FIG. 1 thereof, there is seen an illustration of how a distribution of flow velocities 7 on an outflow side 4 of a carrier structure 2 may be formed. In this case, exhaust gas flows in a through-flow direction 6 from an inflow side 3 of the carrier structure 2 to the outflow side 4 of the carrier structure 2. The carrier structure 2 may, for example, be a honeycomb body wound, rolled or stacked from at least one at least partially structured metal foil 18. However, it may also be a ceramic honeycomb body. Such a carrier structure generally has channels 19 running from the inflow side 3 to the outflow side 4 and defining the flow direction 6 through the carrier structure 2. Although not shown in the drawing, it is possible within the scope and meaning of the invention, for openings to be present between the individual channels 19 within the carrier structure 2, through which openings the exhaust gas can be redistributed within the carrier structure 2, and for the distribution of flow velocities 7 on the inflow side 3 to differ from the distribution of flow velocities 7 on the outflow side 4.

Figure 2:
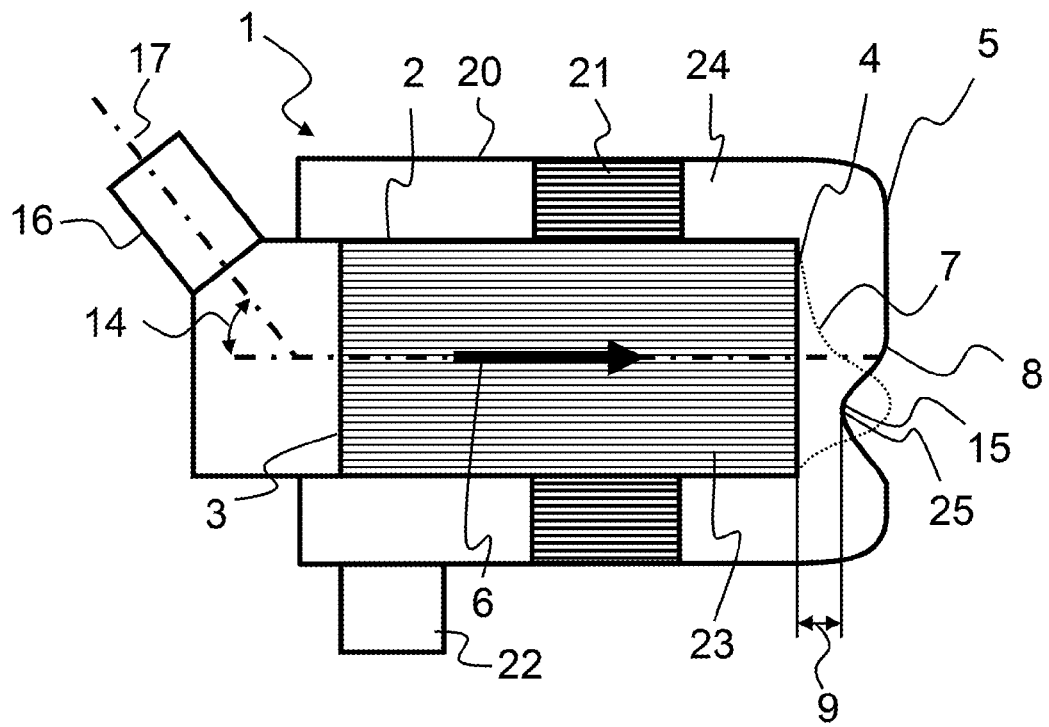
FIG. 2 is a longitudinal-sectional view of a first variant of an exhaust gas cleaning component according to the invention.
Figure 3:
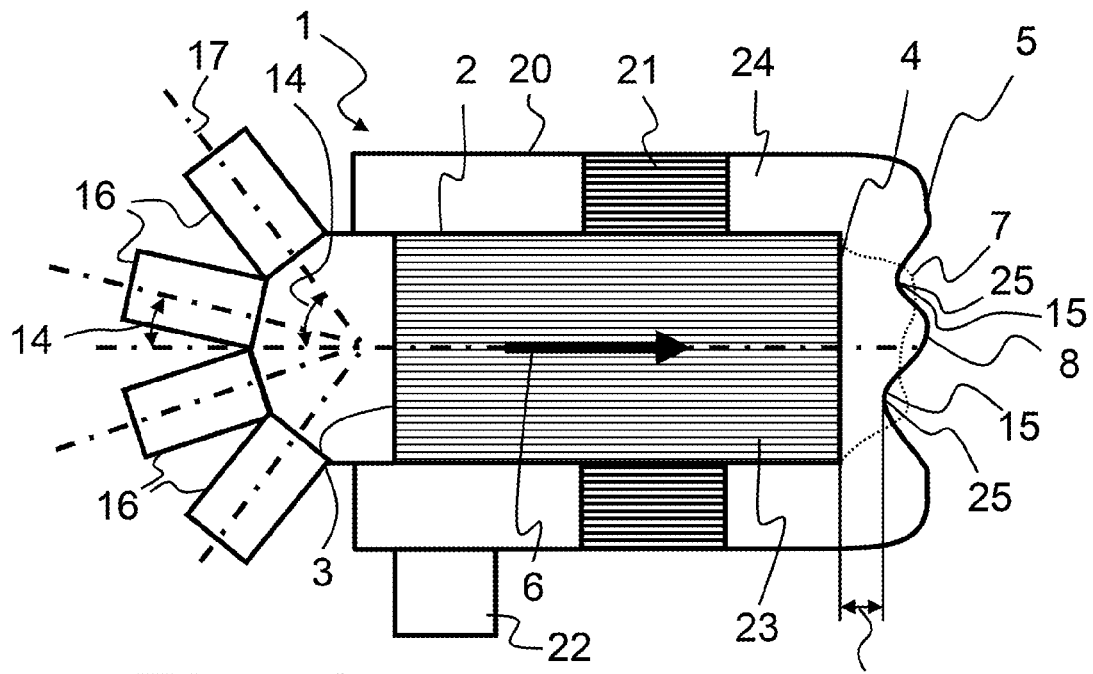
FIG. 3 is a longitudinal-sectional view of a second variant of an exhaust gas cleaning component according to the invention.

FIG. 2 and FIG. 3 show two different variants of exhaust gas cleaning components 1 according to the invention. The exhaust gas cleaning components 1 each have a housing 20 and a carrier structure 2 having an inflow side 3 and an outflow side 4. Exhaust gas passes through the carrier structure 2 in a through-flow direction 6. Inflow conduits 16, which enable exhaust gas to be supplied to the carrier structure 2, are indicated on the inflow side 3. The inflow conduits 16 each have a main direction 17 which is disposed obliquely at an angle 14 with respect to the flow direction 6. According to FIG. 2, one inflow conduit 16 is provided. According to FIG. 3, four inflow conduits 16 are provided. The exhaust gas cleaning component 1 as shown in FIG. 3 may, for example, be connected directly to a plurality of exhaust manifolds.

A deflection surface 5 is provided opposite the outflow side 4 of the carrier structure 2. The deflection surface 5 has a shape 8 with a particular configuration. The shape 8 is configured at least partially in such a way that it produces a homogenization of the exhaust gas flow. The shape 8 of the deflection surface 5 may, for example, have dents, indentations or impressions 15 which form backpressure elements 25 for the exhaust gas flow emerging from the outflow side 4. According to FIG. 2, a deflection surface 5 with one dent 15 is shown. FIG. 3 shows a deflection surface 5 with a plurality of dents 15. In both FIG. 2 and FIG. 3 the undisturbed distributions of flow velocities 7, which would be present if homogenization of the flow by the respective deflection surfaces 5 did not take place, are indicated by broken lines in each case. In the vicinity of the dent 15, the deflection surface 5 is at a distance 9 of less than 40 mm, or even less than 30 mm, from the outflow side 4. In this way a pressure cushion is produced locally in the flow at the dent 15. The pressure cushion counteracts the indicated distribution of the flow velocities 7 which would otherwise prevail, so that this distribution is homogenized.

The exhaust gas cleaning components 1 represented in FIGS. 2 and 3 each have an inflow region 23 having the carrier structure 2. A return flow region 24 is disposed outside and concentrically around the inflow region 23. The shape 8 of the deflection surface is determined only partially by the deflection function of the deflection region 5. The shape 8 is also configured in such a way that a suitable deflection of the exhaust gas flow from the inflow region 23 into the return flow region 24 is effected. Further honeycomb bodies 21 may be disposed in the return flow region 24. The configuration of the deflection surface 5 according to the invention also brings about a uniform inflow into these honeycomb bodies 21. The exhaust gas can leave the exhaust gas cleaning component 1 according to the invention from the return flow region 24 through an exit duct 22.

Figure 4:
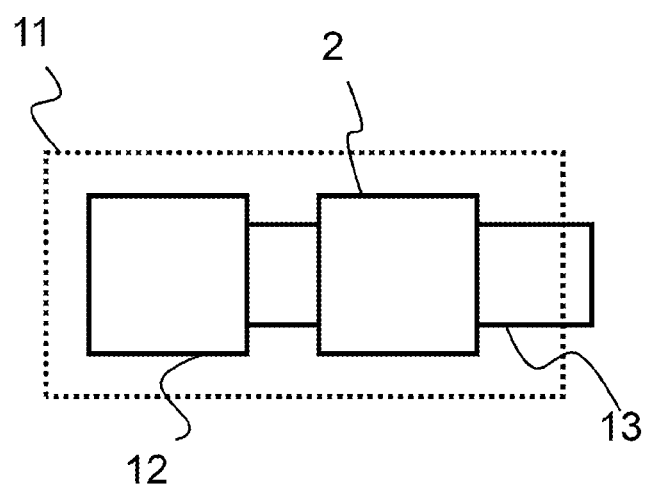
FIG. 4 is a plan view of a motor vehicle which is equipped with an exhaust gas cleaning component according to the invention.

FIG. 4 shows a motor vehicle 11 having an internal combustion engine 12 and an exhaust system 13 with an exhaust gas cleaning component according to the invention.

The method according to the invention and the exhaust gas cleaning component according to the invention make possible an especially advantageous configuration and production of a compact catalytic converter, by which a compact catalytic converter can be further reduced in size and also produced more cost-effectively.

The invention claimed is:

1. A method for producing an exhaust gas cleaning component, the method comprising the following steps:
   a) providing a carrier structure having an inflow side, an outflow side, a predefined through-flow direction, a return flow region disposed concentrically around the carrier structure and a deflection surface disposed opposite the outflow side;
   b) subjecting the carrier structure to an exhaust gas flow from the inflow side to the outflow side in the predefined through-flow direction, and directing the flow to impinge obliquely, at least partially, on the inflow side of the carrier structure at an angle relative to the predefined through-flow direction;
   c) determining a distribution of flow velocities on the outflow side of the carrier structure; and
   d) configuring a shape of the deflection surface with at least one backpressure element in dependence on the distribution of the flow velocities on the outflow side:
      to homogenize the distribution of the flow velocities,
      to deflect the exhaust gas to the concentric return flow region, and
      to provide a distance between the deflection surface and the outflow side of less than 30 mm in regions of elevated flow velocity.

2. The method according to claim 1, which further comprises configuring the shape of the deflection surface zonally to be substantially mirror-inverted relative to a shape of the distribution of the flow velocities, in step d).

3. An exhaust gas cleaning component, comprising:
   a carrier structure having an inflow side, an outflow side, a predefined through-flow direction, a return flow region disposed concentrically around said carrier structure and a deflection surface disposed opposite said outflow side and configured to deflect the exhaust gas to said concentric return flow region;
   said deflection surface configured to cause an exhaust gas flow passing through the exhaust gas cleaning component, with said deflection surface disposed therein, to have a uniformity index greater than 0.8;
   said deflection surface having at least one off-center multiple dent and said deflection surface disposed at a distance from said outflow side of less than 30 mm in the vicinity of said at least one dent; and
   an inflow conduit having a main direction, said main direction and said predefined through-flow direction being disposed at an oblique angle relative to one another.

4. A motor vehicle, comprising:
   an internal combustion engine; and
   an exhaust system for cleaning exhaust gases of said internal combustion engine;
   said exhaust system having an exhaust gas cleaning component according to claim 3.

5. A motor vehicle, comprising:
   an internal combustion engine; and
   an exhaust system for cleaning exhaust gases of said internal combustion engine;
   said exhaust system having an exhaust gas cleaning component produced according to claim 1.

6. The method according to claim 1, wherein the homogenized distribution of flow velocities has a uniformity index greater than 0.8.

7. The method according to claim 6, wherein the uniformity index is determined by the following steps:
   i) determining local flow velocities at a multiplicity of measuring points distributed uniformly over a cross-sectional area parallel to the outflow side of the exhaust gas cleaning component;
   ii) calculating a mean flow velocity from the local flow velocities;
   iii) calculating local non-uniformity indexes by standardization of deviations of the local flow velocities from the mean flow velocity;
   iv) calculating a global non-uniformity index from the local non-uniformity indexes; and
   v) calculating the uniformity index as a reversion of the global non-uniformity index.

8. The exhaust gas cleaning component according to claim 3, wherein said uniformity index is determined by:

i) determining local flow velocities at a multiplicity of measuring points distributed uniformly over a cross-sectional area parallel to said outflow side of the exhaust gas cleaning component;
ii) calculating a mean flow velocity from said local flow velocities;
iii) calculating local non-uniformity indexes by standardization of deviations of said local flow velocities from said mean flow velocity;
iv) calculating a global non-uniformity index from said local non-uniformity indexes; and
v) calculating said uniformity index as a reversion of said global non-uniformity index.

* * * * *